United States Patent [19]

Flory

[11] Patent Number: 4,754,604
[45] Date of Patent: Jul. 5, 1988

[54] HYDRAULIC BRAKE BOOSTER WITH TUBULAR CONDUIT RETURN SPRING

[75] Inventor: Donald M. Flory, Arcanum, Ohio

[73] Assignee: General Motors Corporation, Detroit, Mich.

[21] Appl. No.: 728,262

[22] Filed: Apr. 29, 1985

[51] Int. Cl.$^4$ .............................................. B60T 13/00
[52] U.S. Cl. ...................................... 60/547.1; 60/565; 92/130 R; 267/286
[58] Field of Search ........................ 60/547.1, 554, 560, 60/565; 91/376 R, 443; 267/60, 61 R, 166, 167; 277/165, 170; 251/900; 137/625.69; 92/130 R

[56] References Cited

U.S. PATENT DOCUMENTS

| | | | |
|---|---|---|---|
| 2,601,085 | 6/1952 | Brunner | 277/165 |
| 3,199,540 | 8/1965 | Forster | 137/625.69 |
| 4,283,009 | 8/1981 | Deem | 137/625.69 X |
| 4,421,330 | 12/1983 | Burke | 277/165 X |
| 4,566,275 | 1/1986 | Farr | 60/554 |
| 4,633,907 | 1/1987 | Adams | 251/900 X |

FOREIGN PATENT DOCUMENTS 2602050 8/1977 Fed. Rep. of Germany ..... 60/547.1
789618 1/1958 United Kingdom ................ 277/165

OTHER PUBLICATIONS

Warring, R. H., *Seals and Sealing Handbook*, 1st ed., Houston, Texas, Gulf Pub. Co. 1981, pp. 291, 326.

Primary Examiner—Robert E. Garrett
Assistant Examiner—George Kapsalas
Attorney, Agent, or Firm—D. D. McGraw

[57] ABSTRACT

A hydraulic booster in which the booster piston return spring is formed as a tubular conduit to conduct hydraulic supply pressure to a closed center valve. Upon actuation, the valve opens to permit supply pressure to flow into the power chamber and by valving action controls the exhaust of pressure from the power chamber so as to establish the desired actuating pressure therein. The tubular conduit forming the power piston return spring and transporting the supply pressure to the closed center valve permits a shorter overall axial length of the hydraulic booster by accomodating the movement of the supply pressure chamber at the closed center valve. It also permits less charged supply pressure leaking by accomodating a better pressure seal arrangement.

1 Claim, 2 Drawing Sheets

1

HYDRAULIC BRAKE BOOSTER WITH TUBULAR CONDUIT RETURN SPRING

BACKGROUND OF THE INVENTION

The invention relates to a power booster of the hydraulic type in which pressurized hydraulic fluid is supplied to the booster and, under the control of the valve mechanism herein claimed, pressure is admitted to a power chamber to act on a booster power piston to actuate the booster. The booster is of the closed center type. It is preferably used as a power booster for a brake system, with the booster actuating at least one hydraulic brake circuit through a master cylinder arrangement.

SUMMARY OF THE INVENTION

It is a feature of the invention to provide supply pressure to an annular chamber within the booster power piston and around a portion of the control valve body. The pressure is retained in this annular chamber by seals on the valve body cooperating with a bore wall in the power piston. Actuating pressure is applied to the power piston only when it is desired to actuate the booster. This is accomplished by the valve arrangement embodying the invention. Initial movement of the valve body causes one of the valve body seals to open the pressure-charged annular chamber within the power piston to the power chamber to transmit pressure thereto. The valve body also operates in valving relation with a portion of the bore of the power piston to control the exhaust of hydraulic pressure from the power chamber, and therefore controls the actuating pressure in the power chamber which acts on the power piston. This arrangement permits the pressure seal for the power piston to be at exhaust pressure at all times other than when the booster is being actuated by hydraulic pressure. The power piston seal therefore is not continuously subjected to supply pressure, which could cause pressure leakage when the booster is at the released position and cause the pump to have to continually to make up pressure to take care of the loss in pressure due to such leakage.

DETAILED DESCRIPTION

Figure 1:
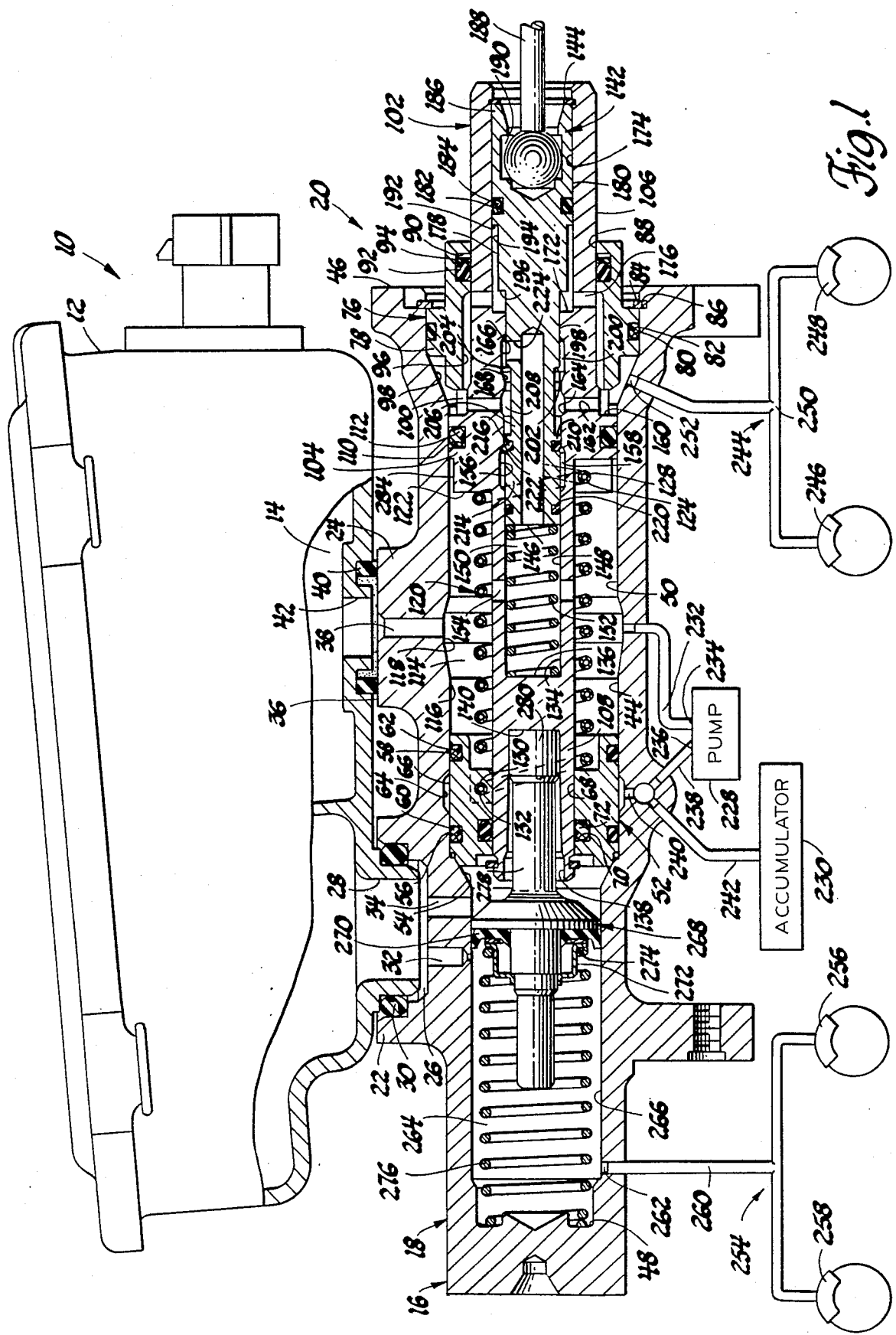
FIG. 1 is a cross-section view, with parts broken away and in elevation, and with other parts illustrated schematically, illustrating a brake system incorporating the hydraulic booster valve arrangement to which the invention is directed.

The booster and master cylinder assembly 10 has a fluid reservoir 12 with a reservoir chamber 14 therein normally containing hydraulic fluid to serve the booster and the entire brake system. While the booster embodying the invention is shown as a part of a brake system for automotive vehicles, it is to be understood that the booster may be used for other purposes. The assembly 10 has a housing 16 containing a master cylinder section 18 and a power booster section 20. The housing 16 has bosses 22 and 24 formed thereon for mounting the reservoir 12 and providing fluid connections between the reservoir chamber 14 and the appropriate portions of the master cylinder section 18 and the power booster section 20. In the construction illustrated, boss 22 has a recess 26 receiving a spigot 28 formed as a part of the reservoir 12, with a seal 30 positioned to seal the spigot relative to the recess wall. The bottom of recess 26 is provided with compensation ports 32 and 34 for the master cylinder section 18, as will be further described. Boss 24 is illustrated as having a flat top surface 36 and a port 38 formed therethrough and extending into the housing of the power booster section 20 to connect with the reservoir chamber 14 as will be further described. A seal 40 seals the reservoir 12 relative to the boss top surface 36. The reservoir port 42 formed in the bottom of the reservoir 12 is in alignment with port 38 and is in continuous fluid communication therewith.

Housing 16 has a bore 44 extending therein from the rear end 46 to the front end thereof, the bore terminating at the front end in an end wall 48. The bore side wall 50 is formed to have various diameters, shoulders and recesses as will be further described.

A conduit retainer and piston guide member 52 is received within bore 44 so that it is axially located against a tapered shoulder 54 of bore wall 50. The member 52 is annular, with circumferentially external seal grooves 56 and 58 formed therein in axially spaced relation and respectively receiving O-ring seals 60 and 62. Seals 60 and 62 seal against the adjacent portions of the bore wall 50. An internal groove or recess 64 is formed in bore wall 50 with member 52 being so axially located that seals 60 and 62 are on axially opposite sides of and beyond the groove or recess 64. Therefore the recess 64 of bore wall 50 and the member 52 cooperate to define an annular chamber 66 which is sealed against pressure leakage along the bore wall. The inner annular surface 68 of member 52 is provided with an inner seal groove 70 containing O-ring seal 72 therein. The inner annular surface 68 and the O-ring seal 72 cooperate with a portion of the power piston to be described to guide the forward end of the power piston and also to seal it. Groove 70 and seal 72 are located generally radially inwardly of seal groove 56 and seal 60. A suitable passage formed within the member 52 connects the annular chamber 66 to a passage forming a connection with a tubular conduit, to be described. The booster is disclosed and claimed in my copending application Ser. No. 728,279 filed on even date herewith and entitled "Hydraulic Power Booster".

Another annular piston guide 76 is received in the rear portion of bore 44. It is provided with a land 78 having an outer circumferential seal groove 80 formed therein containing an O-ring seal 82. Seal 82 seals against the adjacent portion of bore wall 50. A snap ring 84 mounted in a ring groove 86 formed in the portion of bore wall 50 adjacent housing end 46 acts as a stop and retainer for the piston guide 76. The inner annular surface 88 of piston guide 76 has a seal groove 90 formed therein. Seal 92 and a backup washer 94 are contained within groove 90 with seal 92 sealing against another portion of the power piston to be described. The inner annular surface 88 has an undercut portion 96 extending axially and opening into the bore 44 for purposes to be described. The piston guide 76 is also axially located by a tapered shoulder 98 formed as a part of bore wall 50 and also forming a portion of the booster power chamber 100 into which the piston guide undercut portion 96 opens.

The power piston 102 has a land or head 104 with a reduced diameter rearward extension section 106 and another reduced diameter forward extension section 108 extending from opposite sides of piston head 104. The piston head 104 has a seal groove 110 formed in the outer periphery thereof and containing an O-ring seal 112. This seal is in reciprocable sealing relation with the center portion of bore wall 50 just forward of the tapered shoulder 98. The forward extension section 108 of the power piston extends through the member 52 in close but slightly radially spaced relation to the inner annular surface 68 of member 52. Therefore seal 72 is in reciprocable sealing relation with the outer surface of the power piston forward extension section 108. An annular chamber 114 is defined by piston land 104, piston forward extension 108, one side of member 52, and the bore wall section 116 of bore 50 in which the member 52 and the power piston land 104 are received. An annular recess or undercut section 118 of bore wall section 116 slightly enlarges a portion of the outer diameter of annular chamber 114 axially beyond the point at which power piston land 104 may move at maximum booster actuation so that port 38, opening into bore 44 through undercut 118, is always hydraulically fluid connected with the reservoir chamber 14. Therefore the annular chamber 114 is always at exhaust or reservoir pressure.

A tubular conduit 120, formed from a hollow tube and being made of a spring material, is received in chamber 114 about the piston extension 108, the tubular conduit being in a coil spring form. One coil end of tubular conduit and spring 120 engages the member 52 in spring reaction relation and the other end similarly engages the side 122 of power piston land 104 in spring reacting relation. These sides engaged by tubular conduit and spring 120 have circular ramps which provide reaction engagement of a major portion of the end coil as the spring is compressed. As is more particularly illustrated, described and claimed in my copending application noted above, the tubular conduit end 124 is secured to a passage formed in a part of power piston land 104 to provide a fluid type connection 128. The other end 130 of tubular spring 120 is similarly connected to a passage formed in member 52 by means of connection 132. The passage in member 52 to which tubular conduit end 130 is connected is formed in member 52 so that it opens into annular chamber 66 and is therefore in constant fluid communication with that chamber.

Power piston 102 has a bore 134 formed therein so as to be open at the rear end of piston extension 106 and to extend through that extension, the power piston land 104 and through an axial portion of the forward piston extension 108. Bore 134 terminates axially within piston extension 108 so that the forward end of bore 134 is closed by a bulkhead providing an end wall 136. Another bore or recess 138 is formed axially into piston extension 108 from the forward end thereof, terminating at the bulkhead end wall 140. A valve body 142 to be further described is reciprocably received within the power piston bore 134. Valve body 142 is held therein by a retainer and stop such as snap ring 144 located in the rear end of bore 134. The forward end 146 of valve body cooperates with the bore wall 148 of bore 134, and particularly the portion thereof adjacent end wall 136, to define a chamber 150. A piston return spring 152 is located in chamber 150 and engages end wall 136 of the power piston extension 108 and the end 146 of the valve body so as to continually urge the valve body 142 toward its stop 144. A cross-passage 154 in piston extension 108 intersects chamber 150 so that chamber 150 is always in fluid communication with chamber 114 and, through ports 38 and 42, with the reservoir chamber 14. The portion of bore wall 148 radially inward of the power piston land 104 has an enlarged diameter, inwardly opening, groove 156 formed therein. Groove 156 cooperates with the valve body 142 to define an annular chamber 158. The passage into which tubular conduit end 124 opens within land 104 connects with chamber 158 so that hydraulic fluid supply pressure within the tubular conduit 120 is directly communicated to annular chamber 158 at all times.

The side 160 of the power piston defining a portion of the power chamber 100 is axially adjacent a cross-passage 162 formed in a reduced diameter portion of the power piston 102. The outer end of passage 162 opens into and is an effective part of the power chamber 100. The inner end of passage 162 opens into an annular inwardly opening groove 164 formed in a portion of the wall of bore 134. Another groove 166 formed in a portion of the wall of bore 134 is axially spaced slightly rearwardly of groove 164. Groove 166 has a forward edge 168 and a rearward edge 170. Forward edge 168 is one part of the control valve which controls the pressure in the power chamber 100 during booster actuation. The other part is formed on the valve body 142, as will be described. Axially spaced slightly rearwardly of groove 166 is a shoulder 172, formed as a part of the bore wall of bore 134, and also forming the forward end of a slightly enlarged bore section 174 of bore 134. A cross-passage 176 formed through the rearward extension section 106 of power piston 102 opens the forward end of bore section 174 to the undercut 96 formed in the piston guide 76 so that pressure in power chamber 100 is transmitted through undercut 96 and cross-passage 176 to a reaction chamber 178 defined by the forward part of bore section 174, shoulder 172, and a part of the valve body 142.

The valve body 142 has a rearwardly located land 180 located in the rearward portion of bore section 174. Land 180 has an outer peripheral seal groove 182 formed therein with an O-ring seal 184 located in groove 182 so as to be in sealing relation with the portion of the bore wall defining bore section 174. The rear end 186 of the valve body 142 is engageable with stop 144 in the released position of the valve body. A push rod 188 extends into and is pivotally secured within a recess 190 formed in the rear end of valve body 142 so that the push rod may be axially actuated to move the valve body 142 forwardly relative to piston 102 and housing 16 to actuate the booster.

A shoulder 192 defining the forward end of land 180 leads to a slightly reduced diameter portion 194 of the valve body 142, which terminates at another shoulder 196 on the valve body. The outer periphery of reduced diameter portion 194 generally defines the inner periphery of reaction chamber 178.

Forwardly beyond shoulder 196, valve body 142 has a further reduced diameter portion 198 which extends into the annular chamber 200 formed by groove 166 and valve body 142. The forward end of reduced diameter portion 198 terminates at a shoulder 202, the corner edge 204 of which cooperates with groove edge 168 to provide the control valve for controlling the pressure in power chamber 100 when the booster is actuated.

Valve body 142 has a still further reduced diameter portion 206 extending forwardly of shoulder 202 and positioned radially inward of bore groove 164. Valve body reduced diameter portion 206 cooperates with groove 164 and the adjacent portions of the bore wall of bore 134 to define an annular chamber 208 which is continuously connected to power chamber 100 by cross-passage 162 and therefore effectively forms a part of the power chamber 100. The valve land 210 formed on valve body 142 forwardly of reduced diameter portion 206 has a seal groove 212 at its forward side, with the forward wall of the seal groove being of a slightly lesser diameter than the rearward wall formed by land 210. The forward wall of the seal groove is defined by a slightly reduced diameter portion 214 of the valve body 142, that portion extending from groove 156 into the bore wall 148 forming a part of the chamber 150. A truncated rectangular cross-section seal 216 is received in seal groove 212 with the truncated corner 226 thereof facing radially outwardly and forwardly. The forward end of valve body reduced diameter portion 214 has a seal groove 218 formed in the outer periphery thereof and containing an O-ring seal 220, which seals against bore wall 148.

In the released position illustrated in FIG. 1, seal 216 seals against the portion of the bore wall 148 just rearwardly of groove edge 222 of groove 156. Seals 216 and 220 therefore seal the annular chamber 158 during booster release so that hydraulic supply pressure provided to that chamber is not permitted to pass beyond the chamber. Valve body 142 has a radially and axially extending passage 224 opening through the reduced diameter portion opening into groove 166 and the annular chamber 200 defined by groove 166 and valve body 142 so as to continuously connect chamber 200 through valve body passage 224, chamber 150, cross-passage 154, chamber 114, and ports 38 and 42 with the reservoir chamber 14. Therefore annular chamber 200 is always at reservoir pressure and is downstream of any hydraulic pressure flow passing through the booster, that flow and pressure being controlled by the valve formed by groove edge 168 and valve body corner edge 204.

A source of supply pressure is illustrated schematically as including a pump 228 and a pressure accumulator 230 which is pressure charged by pump 228. Pump 228 receives fluid operatively from reservoir chamber 14 through a conduit 232 connecting with chamber 114 through the undercut 118. Conduit 232 is connected to the pump inlet 234. The pump outlet 236 is connected by a conduit 238 to a passage 240 formed in housing 16 and opening into annular chamber 66. Conduit 238 and passage 240 are also connected by conduit 242 to accumulator 230 so that the accumulator is charged by hydraulic pressure generated by pump 228 and is able to supply that pressure by way of passage 240 to annular chamber 66 and thence through tubular conduit 120 to annular chamber 158.

The booster is illustrated as part of a hydraulic brake system for a vehicle. The system has a first brake circuit 244 containing first and second wheel brakes 246 and 248 connected by conduit arrangement 250 to an outlet 252 formed in housing 16 and opening into power chamber 100, appropriately through tapered shoulder 98. Thus power chamber actuating pressure is directly applied to wheel brakes 246 and 248. By way of example, these wheel brakes may be the front axle brakes of a vehicle.

The other brake circuit 254 is illustrated as including a pair of wheel brakes 256 and 258 connected by a conduit arrangement 260 to outlet 262 formed in housing 16 and opening into the forward portion of the pressurizing chamber 264 of the master cylinder section 18. By way of example, the wheel brakes 256 and 258 may be the rear axle wheel brakes of a vehicle. Pressurizing chamber 264 is located in the forward bore section 266 of housing bore 44. A master cylinder pressurizing piston 268 is reciprocably mounted in bore section 266 and cooperates with the bore section, including end wall 48, to define pressurizing chamber 264. The pressurizing piston 268 has a piston cup 270 on the forward side thereof which, in the released position illustrated, just clears compensation port 32. A cup expander and spring retainer 272 is fitted on the forward side of piston 268 and provides reaction for the end 274 of the master cylinder piston return spring 276. The other end of spring 276 reacts against end wall 48 so that the master cylinder piston is continually urged to the released position shown. A rearward piston extension 278 extends into recess 138 of the power piston extension 108 so that the end 280 of piston extension 278 is in abutting engagement with end wall 140 at the bottom of recess 138. Thus the power piston extension 108 acts as an output member for the booster to operate the master cylinder piston 268. As is well known in the art, actuating movement of piston 268 will close off compensation port 32 and then pressurize brake actuating fluid in pressurizing chamber 264 to actuate wheel brakes 256 and 258. It is understood that in some arrangements the master cylinder section 18 may be a dual master cylinder in which separate pressurizing pistons and chambers are provided for separate circuits of a brake system.

In the particular arrangement shown, the effective area of side 160 of the power piston head 104 is equal to the area of the pressurizing side of master cylinder piston 268 so that the booster pressure generated in power chamber 100 is at substantially the same pressure as is the pressure generated in pressurizing chamber 264. Therefore the brake actuating pressures in circuits 244 and 254 are substantially the same. It is to be understood that different areas may be provided if it is considered desirable to have the brake actuating pressures of the brake circuits 244 and 254 be at different pressures.

The brake booster operates as follows. The assembly 10 is illustrated in FIG. 1 in the released position before the brake booster is operated. The reservoir 12 has hydraulic fluid in it and hydraulic fluid fills the various chambers, ports, passages and conduits of the system. The pump 228 has been operational so that it has a full supply pressure charged into the accumulator 230. Full hydraulic supply pressure exists in annular chamber 66 and therefore in the tubular conduit 120 and annular chamber 158. The remainder of the system is at exhaust or reservoir pressure. It is to be understood that the pump 228 is operational so as to maintain supply pressure to the annular chamber 66 at all times should the accumulator be discharged below a predetermined minimum level of supply pressure needed. Therefore pump 228 may or may not be operating at the same time that the booster is being actuated. The pump may, for example, be driven by an electric motor which operates in response to a pressure sensor so as to maintain the desired supply pressure level.

Figure 2:
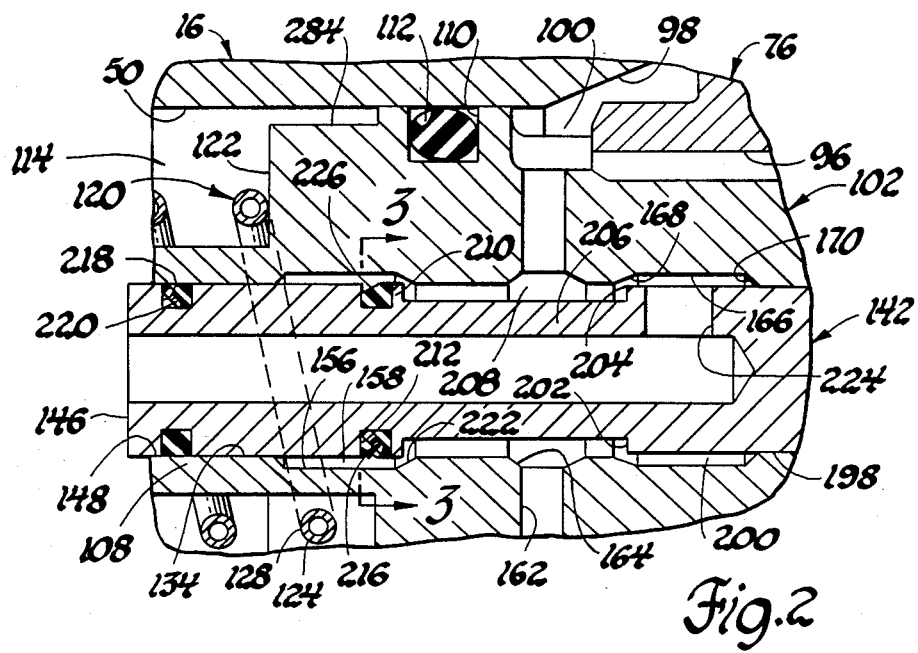
FIG. 2 is an enlarged fragmentary cross-section view of the booster valve arrangement of FIG. 1 with the valve arrangement in the actuated condition.
Figure 3:
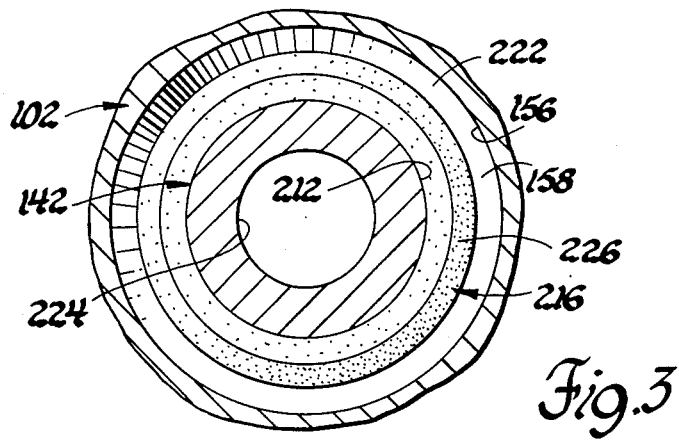
FIG. 3 is a cross-section view of the booster valve arrangement of FIGS. 1 and 2, taken in the direction of arrows 3—3 of FIG. 2 and having parts broken away.
Figure 4:
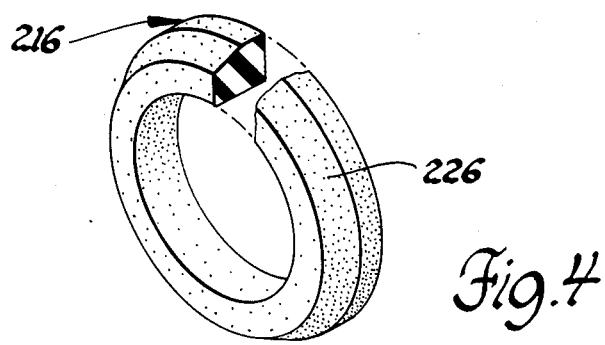
FIG. 4 is a perspective view of a seal used in the valve arrangement.

When the booster operator desires to actuate the booster, he moves push rod 188 axially to the left, or forwardly, as seen in FIG. 1 to move the valve body 142 relative to the power piston 102. This movement is typically accomplished by a brake pedal operatively attached to the push rod 188. This movement takes place against the return force of the valve return spring 152 contained in chamber 150. The forward movement of the valve body 142 moves seal 216 and land 210 forwardly past groove edge 222 so that the supply pressure in the annular chamber 158 flows past land 210 and into the power chamber 100. It also tends to flow past the valve formed by groove edge 168 and corner edge 204, passing through annular chamber 200 and back to the reservoir chamber 14 through passage 224, chamber 150, passage 154, chamber 114, and ports 38 and 42. The corner edge 204 of the control valve approaches the groove edge 168, restricting the pressure flow therethrough and therefore causing the pressure in the power chamber 100 to increase, applying pressure to the power piston to move the power piston leftwardly as seen in the drawing. This condition is illustrated in FIG. 2. The actuating pressure so applied to power chamber 100 will continue to increase with continued forward movement of valve body 142 relative to the power piston and consequent greater restriction by the control valve, and will move the power piston 102 further leftwardly, tending to move groove edge 168 away from the valve corner edge 204 until a balance is reached in which the force generated by the actuating pressure in power chamber 100 is balanced by the resistance to movement of the power piston 102 by the master cylinder section 18. Further leftward movement of the valve body 142 will again further restrict the valve composed of groove edge 168 and corner edge 204, causing the pressure in power chamber 100 to further increase until a new balanced or poised position is reached.

The actuating pressure in power chamber 100 also passes through undercut 96 to chamber 178, where it acts on the slightly increased diameter portion of the valve body 142 to provide a hydraulic reaction force urging the valve body 142 rightwardly as seen in the drawing so that this force is felt by the booster operator through the push rod 188. As the power piston 102 moves in the actuating direction, it compresses the coiled tubular conduit 120, which is also the power piston return spring. It also moves the piston forward extension 108 leftwardly, moving the pressurizing piston 268 leftwardly to initially close compensation port 32 and to then pressurize hydraulic fluid in pressure chamber 264. The fluid so pressurized in chamber 264 passes through outlet 262 and conduit arrangement 260 to actuate the wheel brakes 256 and 258 in circuit 254. In the particular arrangement illustrated in the drawings, the effective area of the power piston on which the actuating pressure in chamber 100 acts is equal to the effective area of the pressurizing piston 268 in the master cylinder section. Therefore the actuating pressure in power chamber 100 is substantially equal to the pressure generated in pressure chamber 264. Therefore, it being desirable in this instance to have the same brake actuating pressures in brake circuits 244 and 254, a second master cylinder section is not required to pressurize the brake circuit 244. Instead, the actuating pressure in power chamber 100 passes through outlet 252 and conduit 250 to actuate wheel brakes 246 and 248. At all times during actuation of the booster, excess supply pressure over that required to actuate the booster in power chamber 100 passes through the valve formed by groove edge 168 and corner edge 204 and is exhausted to the reservoir 12 as above described.

When the booster operator reduces or releases the actuating force on pushrod 188, valve body 142 moves rightwardly as seen in the drawings under urging of spring 152 and the hydraulic reaction force, opening the valve formed by groove edge 168 and valve corner edge 204 so that the actuating pressure in power chamber 100 is reduced by exhausting more of the pressure to the reservoir. If the actuating force is fully removed from pushrod 188, the valve body 142 will return to the position shown in FIG. 1 wherein the control valve is fully opened so that the pressure in the power chamber 100 is fully exhausted to reservoir. The land 210 and the seal 216 move rightwardly so as to pass beyond groove edge 222 and close the fluid connection between the annular chamber 158 and the power chamber 100. The power piston return spring 120 will of course move the power piston 102 rightwardly as the actuating pressure in power chamber 100 decreases, returning the piston to that position shown. This movement of the power piston 102 will also permit the pressurizing piston 268 to be returned to the released position shown by action of its spring 276 as well as by brake actuating pressure in brake circuit 254. When the cup 270 moves rightwardly so as to uncover compensation port 32, any pressure remaining in circuit 254 will be exhausted to reservoir through the compensation port.

In the released position, reservoir or exhaust pressure, typically atmospheric pressure, exists on both sides of the power piston land 104 and therefore its seal 112 is not sealing against an unbalanced pressure. A full charge of supply pressure is still maintained in annular chamber 158, and only seals 216 and 220 are required to seal this pressure. During booster operation as shown in FIG. 2, only seal 220 is sealing full supply pressure, thus minimizing the seal drag due to high pressure on relatively large seal areas and reducing by one seal the number of valve body seals dynamically engaging a bore wall in sealing relation. The tubular conduit 120, in serving the dual function of conducting hydraulic supply pressure to chamber 158 and also acting as the piston return spring, contributes to the overall reduction in length of the booster assembly since the point of introduction of supply pressure to the booster at passage 240 does not have to accommodate the full stroke of the booster piston 102. Instead, this is accommodated by the compression and expansion of the piston return spring as it conducts the supply pressure from that point to the axially moveable annular chamber 158.

The embodiments of the invention in which an exclusive property or privilege is claimed are defined as follows:

1. In a hydraulic power brake booster having a housing, a bore formed in said housing and having a bore wall, a power piston reciprocably received in said bore and having a dynamic seal reciprocably sealing between said power piston and said bore wall, a power chamber in said bore defined in part by one side of said power piston, a brake fluid reservoir, control valve means in said housing adapted to control hydraulic booster actuating pressure to said power piston, a pump operatively receiving hydraulic fluid from said reservoir and operatively providing hydraulic fluid under pressure to said power chamber under control of said valve means, and connection means for connecting said booster to operatively pressurize at least one of a plurality of brake circuits, the improvement comprising:

an annular conduit retainer mounted in said bore on the opposite side of said power piston from said power chamber and forming with said bore wall a first annular chamber about said retainer, first and second retainer seals respectively located on axially opposite sides of said first annular chamber and sealing between said retainer and said bore wall;

said power piston having an extension extending axially through said annular conduit retainer and in reciprocable sealing relation therewith to define between said power piston and said annular conduit retainer a reservoir pressure chamber continuously fluid connected to said reservoir, said power piston extension also providing a booster output member;

said power piston further having a recess therein defined by a side wall with a control valve reciprocably received therein and forming a part of said control valve means, a second annular chamber formed about said control valve with said side wall of said recess, and first and second control valve seals respectively located on axially opposite sides of said second annular chamber and reciprocably sealing between said control valve and said recess side wall, said first control valve seal being moveable axially into said second annular chamber upon actuating movement of said control valve in said power piston recess to fluidly connect said second annular chamber and said power chamber;

said power piston having a third annular chamber formed in said power piston recess about said control valve with the edge of said third annular chamber nearer said power chamber forming a first valve portion;

said control valve having a shoulder thereon positioned in said third annular chamber and having the outer edge thereof forming a second valve portion cooperating with said first valve portion to control hydraulic fluid exhaust from said power chamber with axial relative movements of said control valve and said power piston, a passage in said control valve opening at one end into said reservoir pressure chamber and also opening into said third annular chamber on the opposite side of said second valve portion from said power chamber, said passage providing an exhaust from said power chamber to said reservoir via said reservoir pressure chamber;

and a resilient pressure hydraulic fluid conduit in said reservoir pressure chamber and having one end sealingly secured to said conduit retainer and continuously fluid connected within said conduit retainer to said first annular chamber, and having the other end sealingly secured to said power piston and continuously fluid connected within said power piston to said second annular chamber, so that no hydraulic pressure differential is exerted across said power piston and particularly across said power piston to said bore wall dynamic seal when said booster is not pressure actuated, said resilient pressure hydraulic fluid conduit also being a spring acting on said conduit retainer and said power piston to provide power piston return spring force continuously urging said power piston to the booster release position.

* * * * *